US008796959B2

(12) United States Patent
Sato

(10) Patent No.: US 8,796,959 B2
(45) Date of Patent: Aug. 5, 2014

(54) DISCONTINUOUS LINEAR MOTOR SYSTEM

(71) Applicant: Murata Machinery, Ltd., Kyoto (JP)

(72) Inventor: Tomoki Sato, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 13/867,274

(22) Filed: Apr. 22, 2013

(65) Prior Publication Data

US 2013/0229134 A1 Sep. 5, 2013

Related U.S. Application Data

(63) Continuation of application No. PCT/JP2011/072003, filed on Sep. 27, 2011.

(30) Foreign Application Priority Data

Oct. 26, 2010 (JP) .................................. 2010-239600

(51) Int. Cl.
*H02P 6/00* (2006.01)

(52) U.S. Cl.
CPC ..................................... *H02P 6/006* (2013.01)
USPC ................................ 318/135; 318/34; 318/38

(58) Field of Classification Search
CPC .............................. H02P 6/006; H02K 41/031
USPC .............................................. 318/135, 34, 38
See application file for complete search history.

(56) References Cited

U.S. PATENT DOCUMENTS

| 4,876,966 | A | * | 10/1989 | Okawa et al. | ................. | 104/290 |
| 5,801,462 | A | * | 9/1998 | Yagoto et al. | ............... | 310/12.19 |
| 7,786,685 | B2 | * | 8/2010 | Schueren | ....................... | 318/135 |

FOREIGN PATENT DOCUMENTS

| JP | 63-114887 A | 5/1988 |
| JP | 05-168283 A | 7/1993 |
| JP | 2000-245128 A | 9/2000 |
| JP | 2001-180479 A | 7/2001 |
| JP | 2003-244929 A | 8/2003 |
| JP | 2007-082307 A | 3/2007 |
| JP | 2010-130740 A | 6/2010 |

OTHER PUBLICATIONS

English translation of Official Communication issued in corresponding International Application PCT/JP2011/072003, mailed on May 23, 2013.
Official Communication issued in International Patent Application No. PCT/JP2011/072003, mailed on Dec. 20, 2011.

* cited by examiner

*Primary Examiner* — David Luo
(74) *Attorney, Agent, or Firm* — Keating & Bennett, LLP

(57) ABSTRACT

A linear motor system includes a discontinuous linear motor and motor control device. The discontinuous linear motor includes a mover and a plurality of individual motors spaced from each other along a movement path of the mover. Each of the individual motors functions as an armature on a primary side of one independent linear motor. A sensor, arranged to act as a linear scale, is disposed for each individual motor and detects a position of the mover. The motor control device includes a plurality of individual motor control units and a multiple unit controller to comprehensively control the individual motor control units. The individual motor control units control the individual motors disposed in curved path sections, and each of the individual motor control units includes a curved-line correspondence corrector to correct a detection value obtained from the sensor according to a relationship between a curved line of the path and a position of the sensor.

4 Claims, 8 Drawing Sheets

DISCONTINUOUS LINEAR MOTOR SYSTEM

CROSS-REFERENCE TO THE RELATED APPLICATION

The present application is a continuation application, under 35 U.S.C §111(a) of international application No. PCT/JP2011/072003, filed Sep. 27, 2011, which claims Convention priority to Japanese patent application No. 2010-239600, filed Oct. 26, 2010, the entire disclosure of which is herein incorporated by reference as a part of this application.

BACKGROUND OF THE INVENTION

1. Field of the Invention

The present invention relates to discontinuous or discrete linear motor systems used to drive transport apparatuses for use in machine tools and industrial machinery, and for driving various other devices.

2. Description of the Related Art

Linear motors have been employed in, for example, a conveyor carriage employed in a physical distributing apparatus or a transport apparatus acting as a machine tool loader (for, example, JP Laid-open Patent Publication No. 63-114887). While the linear motor is available in various types such as, for example, a linear induction motor (LIM), a linear synchronous motor (LSM) and a linear direct current motor, the linear induction motor is employed in a long distance conveyance system. A main type of this linear synchronous motor is one including magnets, installed on the ground side, and a coil side installed movably. The example, such as disclosed in the JP Laid-open Patent Publication No. 2007-82307 listed below, has been suggested in which primary coils of the linear synchronous motor system are partially discretely arranged on the ground side. However, the linear synchronous motor system utilized in such a case is only used in an auxiliary manner at the curved path section, and the linear induction motor is mainly utilized even in such a case. Also, a sensor to detect a position of a mover, such as a needle, a magnet array or a movable coil, is provided relative to only a part of the primary coils.

PRIOR ART LITERATURE

[Patent Document 1] JP Laid-open Patent Publication No. 63-114887
[Patent Document 2] JP Laid-open Patent Publication No. 2007-82307

The linear induction motor has a thrust so low that it is difficult to increase the traveling performance, and therefore, an attempt to employ a linear induction motor has been made in applying the conveyance system to the transport apparatus acting as the machine tool loader. Most of the prior art linear synchronous motors are of a type in which the magnets are arranged on the ground side and the coil side is made movable. However, in order to move the coil side, a supply of electric power to the mover is required and, hence, in view of the necessity of wiring lines, it is impossible to accomplish an endless transport path and the transport path tends to be limited in length, and also, the power feeding system tends to become complicated. Therefore, in a linear synchronous motor, an attempt to dispose the primary coils on the ground side has been made. However, in a case where the primary coils are disposed on the ground side, if the coils are continuously disposed over the entire length of a movement path, as is the case in the conventional linear motors, coils to be used are increased, which leads to increased costs.

In order to solve the aforementioned problems, as a synchronous type of linear motor, a discontinuous or discrete linear synchronous motor has been suggested in which a plurality of individual motors acting as armatures are aligned so as to be spaced from each other in a mover moving direction, each of the armatures being capable of functioning as an armature on a primary side of one independent linear motor. However, a control method thereof and the use of sensors have not been specified.

Furthermore, a conventional standard linear motor needs to have a dedicated control device to perform a position control and a speed control in a curved path section, and the control device cannot double as a device for control of running on a rectilinear path section. Therefore, there is a problem that a linear motor system including a curved path section causes an increase in cost. Moreover, high-precision detection of magnet pole positions in the curved path section cannot be performed, so that positioning and speed control in the curved path section cannot be accurately performed.

SUMMARY OF THE INVENTION

Preferred embodiments of the present invention enable a reduction in a number of coils to be used in a discontinuous linear motor system and a simplification of a power supply system by discontinuously disposing primary coils, and also enable components to be shared in plural portions of a path and cost to be reduced.

According to a preferred embodiment of the present invention, a discontinuous linear motor system includes a linear motor system that includes a linear motor and a motor control device to control the linear motor. The linear motor is a discontinuous linear motor, which includes a mover including permanent magnets and a plurality of individual motors spaced from each other along a movement path of the mover. Each of the individual motors functions as an armature on a primary side of one independent linear motor, and includes coils of different phases, respectively, aligned in a straight line direction. A sensor, as a linear scale, arranged to detect a position of the mover is disposed for each individual motor along the straight-line direction corresponding to a coil-aligned direction. The motor control device includes a plurality of individual motor control units to control the individual motors and a multiple unit controller to send a position command to the plurality of individual motor control units. Each of the individual motor control units is disposed relative to a set of the individual motor and the sensor, and controls the individual motor in the set.

Since the individual motors which act as armatures on a primary side are discontinuously disposed as a stationary side, a reduction in a number of coils to be used can be accomplished, and also, a power supply system can be simplified as compared to a case where power is supplied to a movement side. Further, one of the plurality of individual motors that act as armatures on the primary side, the sensor, and the individual motor control unit to control the one of the plurality of individual motors are provided so as to define a set, and the individual motor, the sensor, and the individual motor control unit are disposed along the coil-aligned direction. Therefore, the components can be shared in plural portions of the path, and cost can be reduced.

According to a preferred embodiment of the present invention, the movement path of the mover may include a curved path section, and each of the individual motor control units arranged to control the individual motors disposed in the curved path section may include a curved-line correspondence corrector arranged to correct a detection value obtained from the sensor according to a relationship between a curved line of the curved path section and a position of the sensor, so as to control the individual motors with the use of the corrected detection value. According to the above arrangement, the same components as provided in the rectilinear path section, as a set of the individual motor, the sensor, and the individual motor control unit, are used also in the curved path section, and the individual motor control unit is simply provided with the curved-line correspondence corrector configured by a program in the curved path section so as to enable position control and speed control to be accurately performed in the curved path section.

In this case, each individual motor control unit may include a current control section to perform current control according to a magnetic pole position of the mover, and the curved-line correspondence corrector may determine the magnetic pole position of the mover from the output of the sensor according to a predetermined Equation 1 indicated below, and then inputs the determined magnetic pole position to the current control section.

[Equation 1]

$$x_{mi} = \frac{n\pi(s - x_{offset\,i})}{t_p} + c(x) \quad (1)$$

In Equation 1:

$x_{mi}$: a magnetic pole position (rad) for an i-th (i is a natural number) individual motor, s: a sensor output value, $x_{offset\,i}$: a position at which a magnetic pole alignment for the i-th individual motor is performed, $t_p$: a magnetic pole pitch, c(x): a correction term, and n: a sensor magnification (a ratio of a distance to the sensor from a center of curvature of the curved path section, relative to a distance therefrom to a position of a path center line).

Thus, a magnetic pole position can be accurately detected in the curved path section, and accurate position control and speed control can be performed in the curved path section. In the synchronous type of linear motor, when an inrush of the mover including the permanent magnets into the individual motors occurs, a coil inductance and/or interlinkage magnetic flux vary according to a position. Therefore, current control based on the magnetic pole position is significant for accurate position control and speed control. For the current control based on the magnetic pole position, the accurate detection of the magnetic pole position is necessary. However, when the sensor acting as a linear scale is used, it is difficult to detect the magnetic pole position in the curved path section. This problem can be solved by the technique using the Equation 1 indicated above.

According to a preferred embodiment of the present invention, the multiple unit controller may include command generator arranged to generate a position command to operate each individual motor from an input position command The command generator may include: a motor pitch measurement section to measure a motor pitch, that is a pitch between the individual motors, by using outputs of the sensor; and a command generation section to generate the position command to operate each individual motor, from the measured motor pitch, according to predetermined formulas (2) and (3) of Equation 2 indicated below.

[Equation 2]

$$\begin{cases} x_i^* = \dot{x} - \sum_{j=1}^{i-1} d_j(x) & (2) \\ d_i(x) = \frac{x_{i+1} - x_i}{k} & (3) \end{cases}$$

In Equation 2:

xi*: a position command for an individual motor i, $d_i(x)$: the motor pitch, $x_i$: a position feedback from the individual motor control unit i, and k: a conversion coefficient (according to specifications of the sensor).

The correction term c(x) is a function according to a position of the mover, and may be determined as appropriate. For example, the correction term c(x) takes a value ranging from 0π to 2π according to a position (x) in consideration of a skew angle of the individual motor.

Thus, a position command for each individual motor is generated by using a magnetic pole position, a positional relationship between the sensor and the path, an offset value for a sensor output, and the like. Therefore, even the discontinuous linear motor can advantageously compensate a nonlinearity of outputs from the sensors.

Any combination of at least two constructions of preferred embodiments of the present invention is included within the scope of the present invention.

The above and other elements, features, steps, characteristics and advantages of the present invention will become more apparent from the following detailed description of the preferred embodiments with reference to the attached drawings.

BRIEF DESCRIPTION OF THE DRAWINGS

In any event, the present invention will become more clearly understood from the following description of preferred embodiments thereof, when taken in conjunction with the accompanying drawings. However, the preferred embodiments and the drawings are given only for the purpose of illustration and explanation, and are not to be taken as limiting the scope of the present invention in any way whatsoever. In the accompanying drawings, like reference numerals are used to denote like elements throughout the several views.

DETAILED DESCRIPTION OF THE PREFERRED EMBODIMENTS

Figure 1:
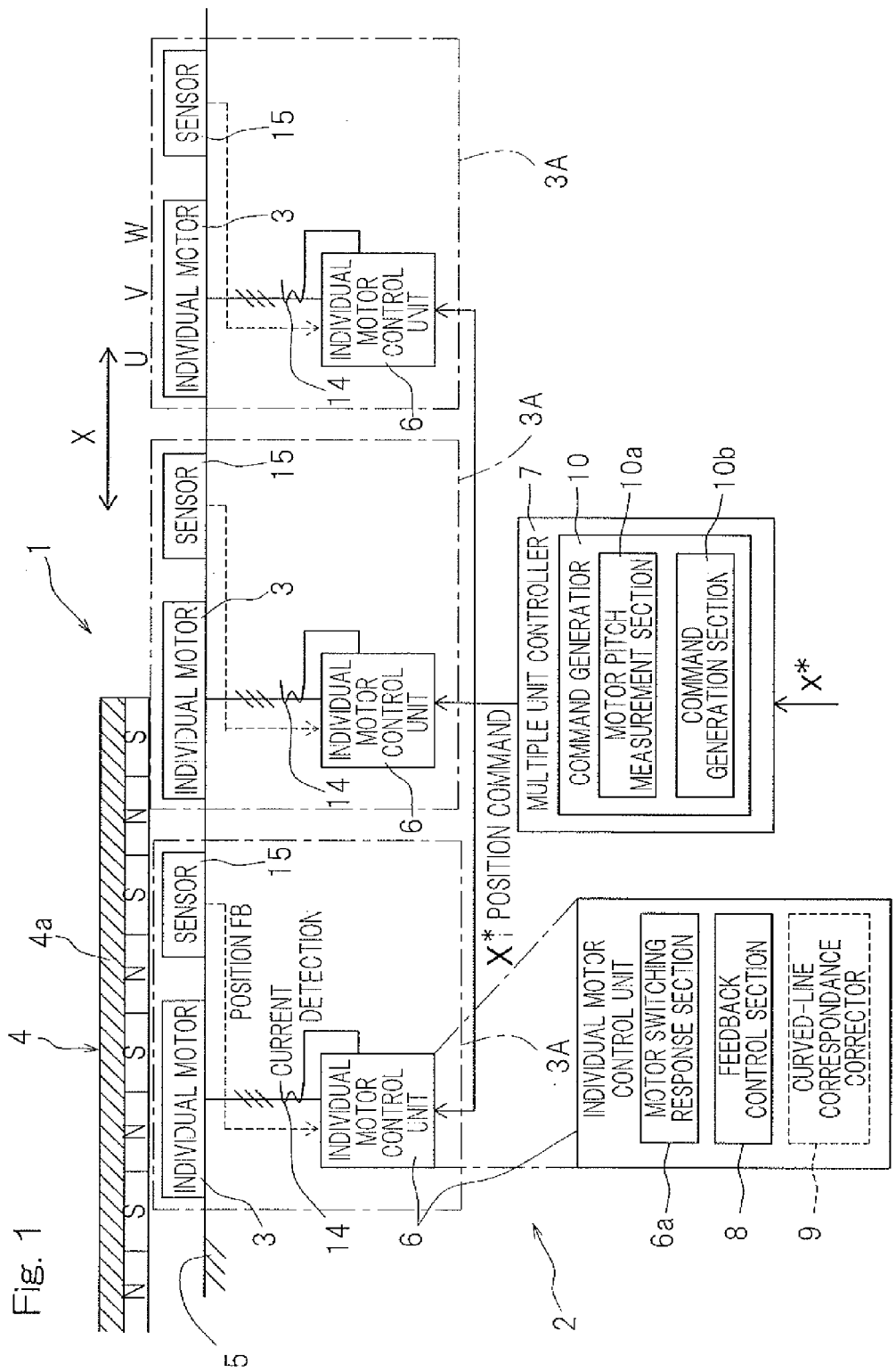
FIG. 1 is a block diagram illustrating a conceptual structure of a discontinuous linear motor system according to a preferred embodiment of the present invention.

Preferred embodiments of the present invention will be described with reference to FIG. 1 to FIG. 12. In FIG. 1, a discontinuous linear motor system of the present preferred embodiment preferably includes a linear motor 1 and a control device 2 that controls the linear motor 1. The linear motor 1 is preferably a linear synchronous motor (LSM), and preferably is a discontinuous linear motor which includes a movable magnet array or mover 4 and a plurality of individual motors 3 acting as armatures spaced from each other in a mover moving direction X. Each of the individual motors 3 functions as an armature on a primary side of one independent linear motor, and is provided on a common frame 5 including a rail (not shown) of the mover 4. In addition, a sensor 15 acting as a position detector that detects a position of the mover 4 is preferably provided on the frame 5 for each individual motor 3. Although each sensor 15 is illustrated as being positioned between the individual motors 3 for convenience in FIG. 1, each sensor 15 is actually disposed in the same position as the corresponding individual motor 3 in the mover moving direction (the X-direction).

The mover 4 preferably includes a mover base body 4a in which a plurality of N and S magnetic poles comprised of permanent magnets are aligned in the mover moving direction X, and is movably guided on the rail (not shown) provided in the frame 5. The N magnetic poles and the S magnetic poles of the mover 4 are disposed at equal pitches.

Figure 3A:
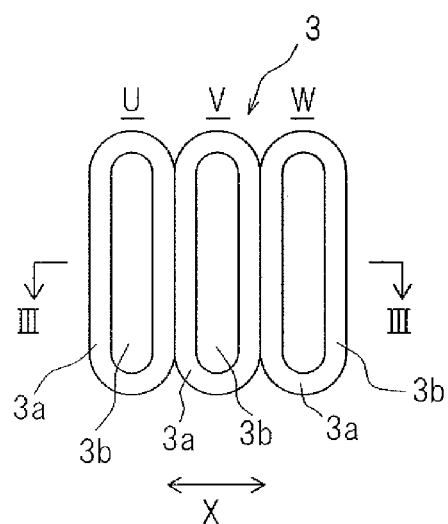
FIG. 3A is a plan view of an example of the individual motor of the linear motor according to a preferred embodiment of the present invention.
Figure 3B:
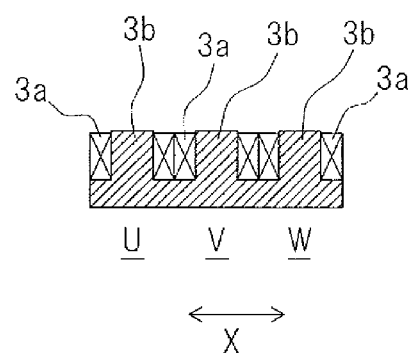
FIG. 3B is a cross-sectional view taken along a line III-III in FIG. 3A.

As shown in, for example, FIGS. 3A and 3B, each individual motor 3 preferably includes a plurality of coils 3a and a plurality of cores 3b acting as magnetic poles for respective layers, and the coils 3a and the cores 3b are aligned in a straight line direction corresponding to the mover moving direction X. Each core 3b preferably is a comb-shaped portion that projects from a common body portion. In the preferred embodiment of the present invention now under discussion, the individual motor 3 is preferably driven by three-phase AC source, and acts as a three-pole armature on a primary side, which has one magnetic pole for each of the phases (U, V, and W phases). The individual motor 3 may be an armature in which a plurality of magnetic poles are provided for each of the phases (U, V, and W phases) and the number of magnetic poles is an integral multiple of the number of the phases.

Figure 2:
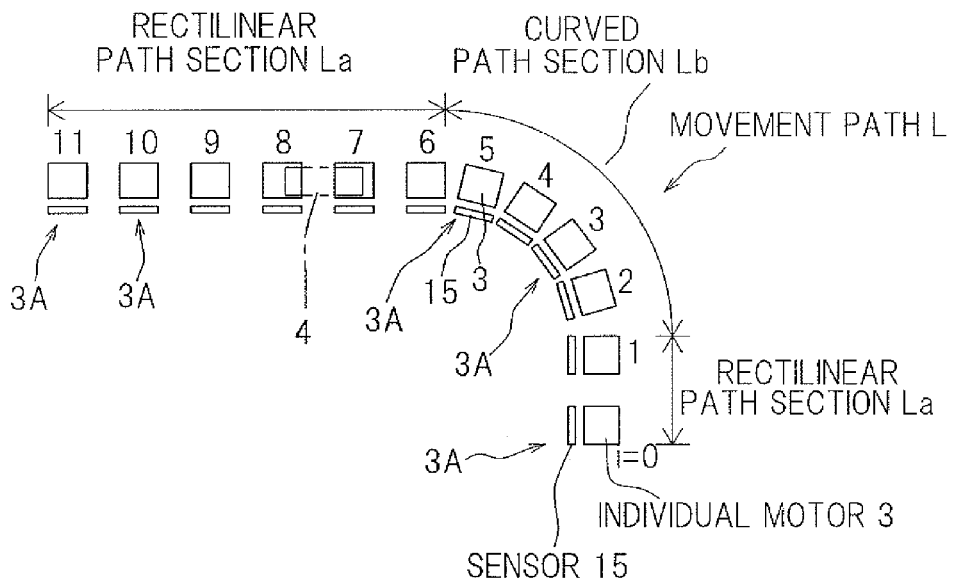
FIG. 2 is a plan view of an exemplary layout of positioning of individual motors and sensors in the linear motor according to a preferred embodiment of the present invention.
Figure 9:
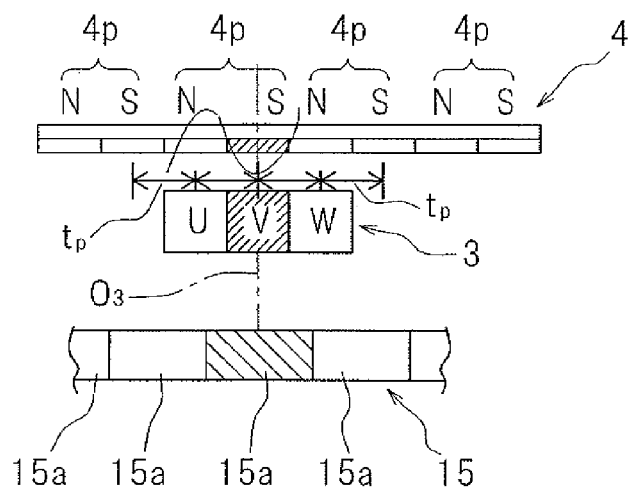
FIG. 9 illustrates a magnetic pole position of a mover of the linear motor according to a preferred embodiment of the present invention.

As shown in FIG. 2, the sensors 15 are arranged to act as a linear scale, and are arranged along a straight line direction corresponding to a direction in which the coils 3a of the individual motors 3 are aligned, and are each capable of detecting a position in a range slightly longer than a length of each individual motor 3. Specifically, as shown in FIG. 9, each sensor 15 preferably includes a plurality of sensor elements 15a aligned in the length direction, and each sensor element 15a detects a magnetic force of the mover 4. Although each sensor 15 outputs one position detection value to detect a position of the mover 4 from the outputs from the sensor elements 15a, an output of a specific one of the sensor elements 15a, for example, the sensor element 15a disposed at a position corresponding to the center position of each individual motor 3, may be enabled.

The control device 2 in FIG. 1 preferably includes a plurality of individual motor control units 6 to control the respective individual motors 3 and one multiple unit controller 7 to provide position commands to the plurality of individual motor control units 6. The individual motor 3, the individual motor control unit 6, and the sensor 15 define one individual motor set 3A.

As shown in, for example, a plan view of FIG. 2, the individual motor sets 3A are preferably disposed along a movement path L on which the mover 4 moves. The movement path L shown in FIG. 2 includes two rectilinear path sections La positioned so as to be perpendicular or substantially perpendicular to each other and one curved path section Lb positioned between the two rectilinear path sections La. The curved path section Lb defines a curved line shaped in an arc. A plurality of the individual motor sets 3A are disposed in each of the rectilinear path sections La, and a plurality (for example, three shown in the drawings) of the individual motor sets 3A are disposed also in the curved path section Lb. Each individual motor set 3A preferably has the same structure (however, a portion of programs, set data, or the like in the individual motor control unit 6 (FIG. 1) may be different), and the individual motor sets 3A having the same structure are disposed in the rectilinear path sections La and the curved path section Lb. In each individual motor set 3A, the individual motor 3 and a circuit substrate defining the individual motor control unit 6 are disposed one on top of the other, and the sensor 15, configured as a linear sensor, is disposed laterally of the movement path L relative to each individual motor 3. It is noted that the movement path L shown in FIG. 2 is an exemplary one, and the movement path L may have any desirable shape such as, for example, continuously ring-shape, S-shape, a free curve, etc.

Figure 5:
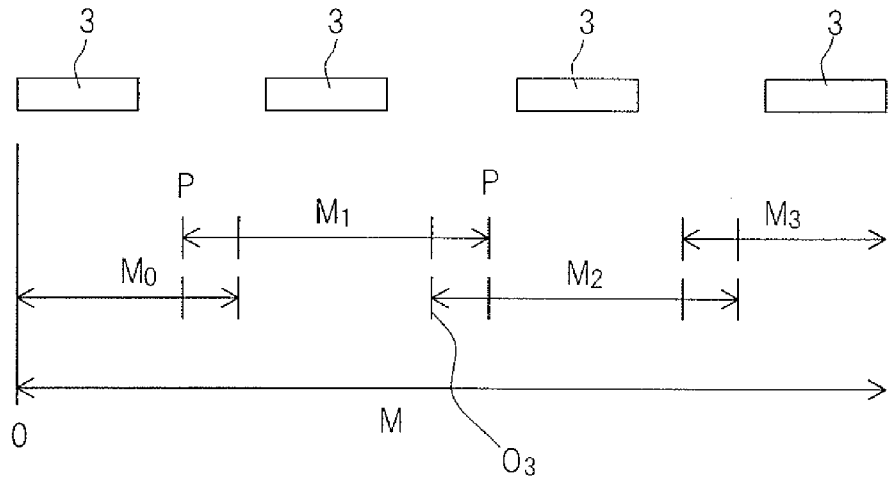
FIG. 5 illustrates a relationship between a range in which the discontinuous linear motor moves and an operational range of each individual motor according to a preferred embodiment of the present invention.

The multiple unit controller 7 in FIG. 1 is preferably defined by a low-current circuit element, a computer, a portion of programs of the computer, and the like. As shown in FIG. 5, the multiple unit controller 7 has information of an operational range $M_i$ (i represents any natural number, such that $M_i$ includes $M_0$-$M_3$, for example) obtained by the entirety of a movement range M of the linear motor being divided per each individual motor 3. Since the individual motors 3 are discontinuously disposed, each operational range $M_i$ has a length range longer than a length of each individual motor 3.

Further, the operational ranges $M_i$ adjacent to each other partially overlap each other in order to assuredly obtain a driving force at a position which is distant from each individual motor 3 to some degree. Specifically, for example, the two individual motors 3 operate in a range between the neighboring individual motors 3. The multiple unit controller 7 preferably generates a position command $x_i^*$ to operate each individual motor 3 through a command generator 10, based on a position command $x^*$ inputted from high-order control unit (not shown).

Each individual motor control unit 6 preferably includes a high-current motor driving circuit (not shown) arranged to apply motor electric current to the corresponding individual motor 3 and a low-current control section (not shown) to control the motor driving circuit, and has circuit components mounted on a substrate. The high-current motor driving circuit is implemented as, for example, an inverter including a plurality of switching elements mounted therein, and is connected to a driving DC power supply (not shown). The low-current control section of the individual motor control unit 6 includes a microcomputer and programs thereof, circuit components, and the like.

The low-current control section of each individual motor control unit 6 preferably includes a motor switching response section 6a and a feedback control section 8. Each individual motor control unit 6 of the individual motors 3 provided in the curved path section Lb preferably includes a curved-line correspondence corrector 9 in addition to the sections described above. The motor switching response section 6a transfers, in response to a position command input from the multiple unit controller 7, the input position command to the feedback control section 8.

Figure 4:
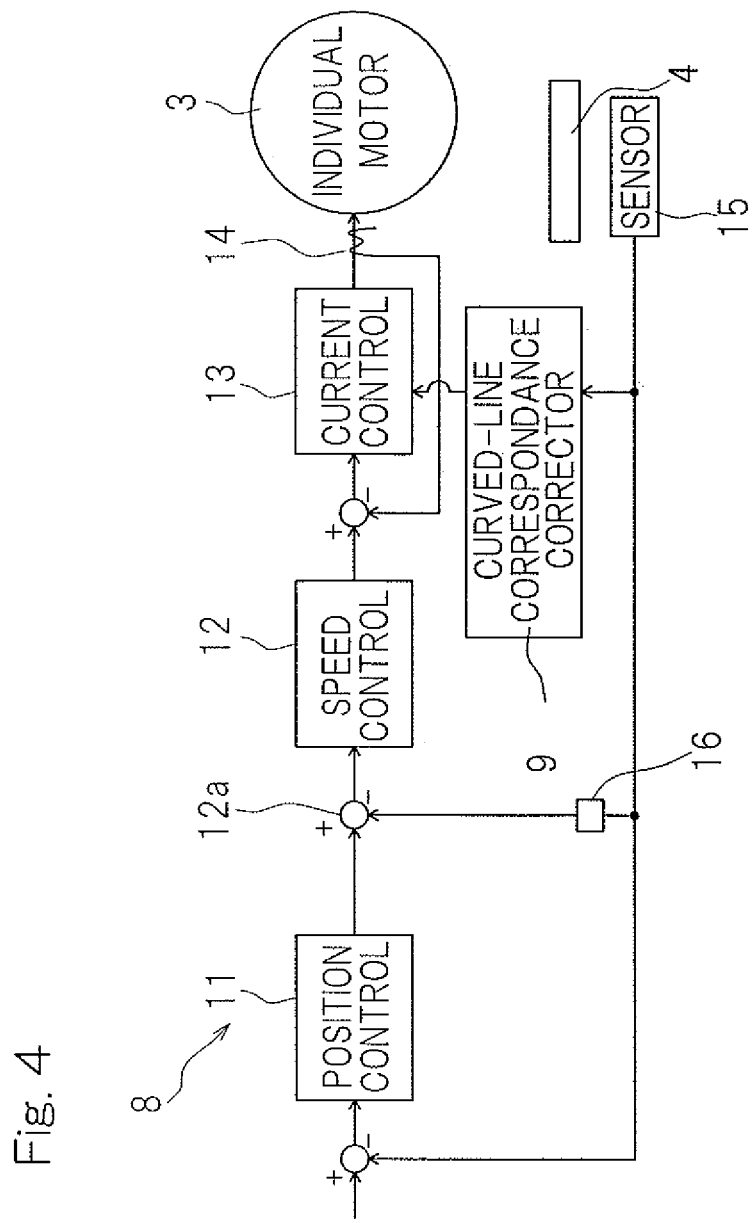
FIG. 4 is a block diagram illustrating a feedback control section and curved-line correspondence corrector in a control device of the linear motor system according to a preferred embodiment of the present invention.

As illustrated in FIG. 4, the feedback control section 8 preferably includes a position control section 11, a speed control section 12, and a current control section 13 that perform feedback-control of a position, a speed, and a current, respectively. In other words, the feedback control section 8 performs a cascade control including a position loop, a speed loop, and a current loop.

The position control section 11 preferably performs feedback-control of a predetermined position loop gain according to a deviation between a command value of the position command and a detected value of the sensor 15 that detects a present position of the mover 4 relative to the individual motor 3. The position control section 11 outputs a speed command value as its output. The speed control section 12 performs feedback-control of a predetermined speed loop gain, according to a deviation between the speed command value and a detected speed value obtained through speed detector 16, such as a differential circuit, which detects a speed from a detected position value of the sensor 15. The speed control section 12 outputs a current command value as its output. The current control section 13 preferably detects a driving current, applied to the individual motor 3, through a current detector 14 such as, for example, a current sensor, and then generates a current command value according to a deviation between the current command value and a detected current value by using a predetermined current loop gain so as to control a motor driving current. The current control section 13 includes, for example, a vector control, and controls a current in accordance with a magnetic pole position of the mover 4.

The curved-line correspondence corrector 9 is operable to correct a detection value obtained from the sensor 15 according to a relationship between a curved line of the curved path section Lb and a position of the sensor 15, so as to control the individual motor 3 with the use of the corrected detection value.

Specifically, the curved-line correspondence corrector 9 is arranged to determine a magnetic pole position of the mover 4 with the use of the output of the sensor 15 according to a predetermined equation, and then inputs the determined position to the current control section 13 (FIG. 4). Formula (1) of Equation 3 as indicated below is used as the predetermined equation.

[Equation 3]

$$x_{mi} = \frac{n\pi(s - x_{offset\,i})}{t_p} + c(x) \qquad (1)$$

In the above equation, $x_{mi}$ represents a magnetic pole position (rad) for an i-th (i represents a natural number) individual motor, s represents a sensor output value, $x_{offset\,i}$ represents a position at which a magnetic pole alignment for the i-th individual motor is performed, $t_p$ represents a magnetic pole pitch, c(x) represents a correction term, and n represents a sensor magnification (a ratio between a distance to a position of a path center line from the center of curvature of the curved path section and a distance to the sensor therefrom).

As shown in FIG. 9, the magnetic pole position represents a predetermined specific position in any magnetic pole pair 4p (the second magnetic pole pair in FIG. 9) of N and S poles of the mover 4 relative to a center position $O_3$ of the individual motor 3 in the mover moving direction. In an illustrated example, the predetermined specific position is defined as a position at which a magnetic force at the S pole is maximum. The unit of the magnetic pole position is (rad). $X_{mi}$ represents a magnetic pole position for the i-th individual motor. The respective magnetic pole pairs are preferably disposed at equal pitches.

The sensor output value s represents an output of the sensor element 15a positioned at the center position $O_3$ among the sensor elements 15a that are the magnetic sensor elements of each sensor 15, and a detected magnetic force (an intensity of a magnetic field) is outputted as, for example, a voltage value.

$x_{offset\,i}$ represents, for example, a position at which a magnetic pole alignment for the i-th individual motor 3 is performed. When the magnetic field is constant, it is ideal that the sensor element 15a is set so as to exhibit a linear output regardless of a position in the X-direction (mover moving direction). However, the output varies due to the setting. Therefore, a sensor output value measured at a predetermined specific position is stored as an offset value ($x_{offset}$), and is subtracted from the sensor output. $x_{offset\,i}$ represents values as shown in, for example, FIG. 12. The value varies depending on specifications of the system and specifications of the sensor. Although an exemplary case, where a position at which the magnetic pole alignment is performed represents a reference, is described, in this case, an adjustment is made such that the position, at which the magnetic pole alignment is performed, represents zero. $x_{offset\,i}$ is a value determined in an initialization, and does not change. In the system of the preferred embodiment now under discussion, the magnetic pole alignment operation is performed when the system is booted and a servo driver of each individual motor control unit 6 stores $x_{offset\,i}$ (this is performed only once when the system is booted).

Figure 6:
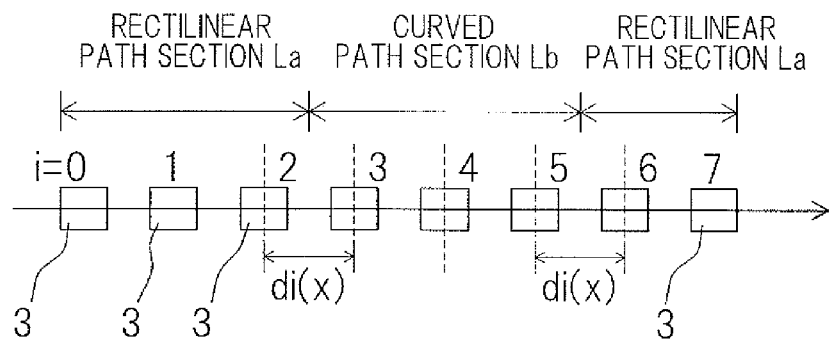
FIG. 6 illustrates pitches at which the individual motors of the linear motor are disposed according to a preferred embodiment of the present invention.
Figure 12:
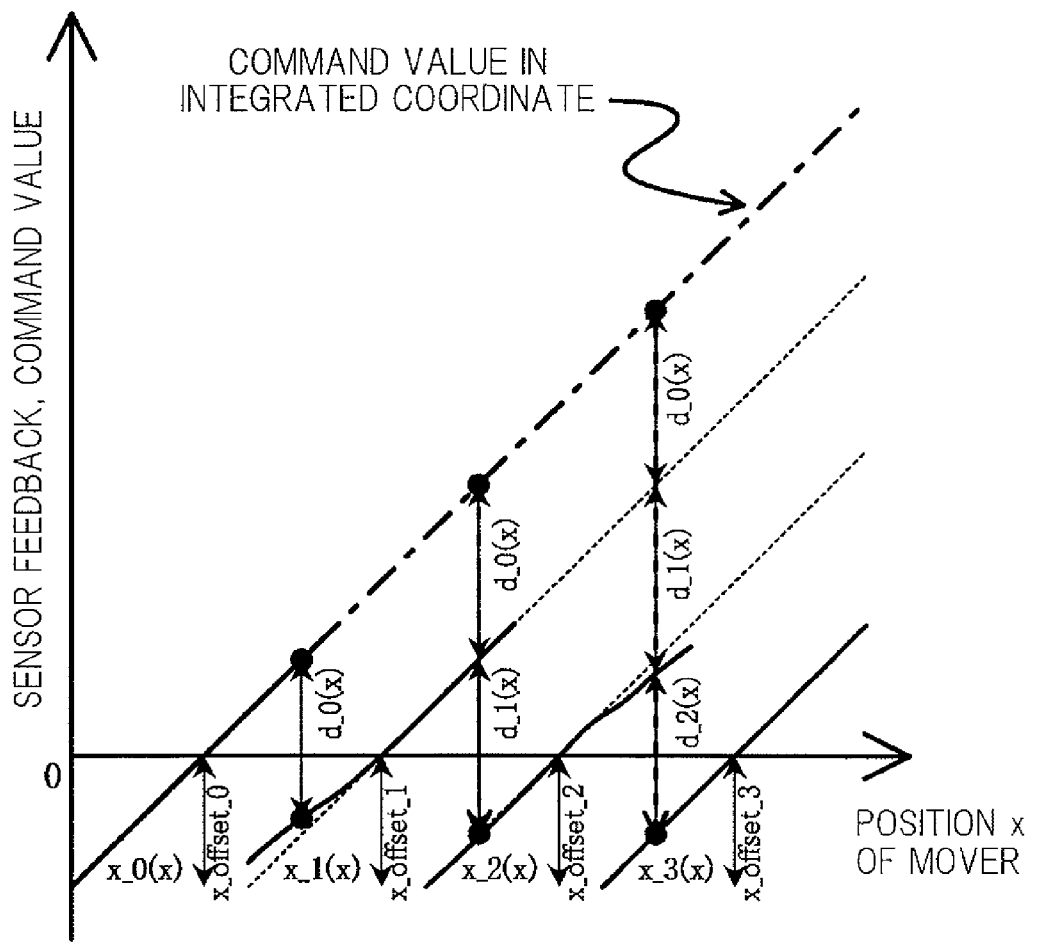
FIG. 12 illustrates $x_{offset\ i}$ according to non-linearity of sensor feedback according to a preferred embodiment of the present invention.

As associated information, $d_i(x)$ shown in FIG. 6 is indicated. $d_i(x)$ is defined as a value that varies according to a position of the mover 4. FIG. 12 shows the values (the number of the individual motors 3 is four in FIG. 12). When the sensor feedback is non-linear, operation is performed while $d_i(x)$ is being measured so as to generate a command value for each motor in consideration of the non-linearity of the sensor feedback.

Compensation of the non-linearity of the sensor feedback according to a position command value generation will now be described.

Figure 11A:
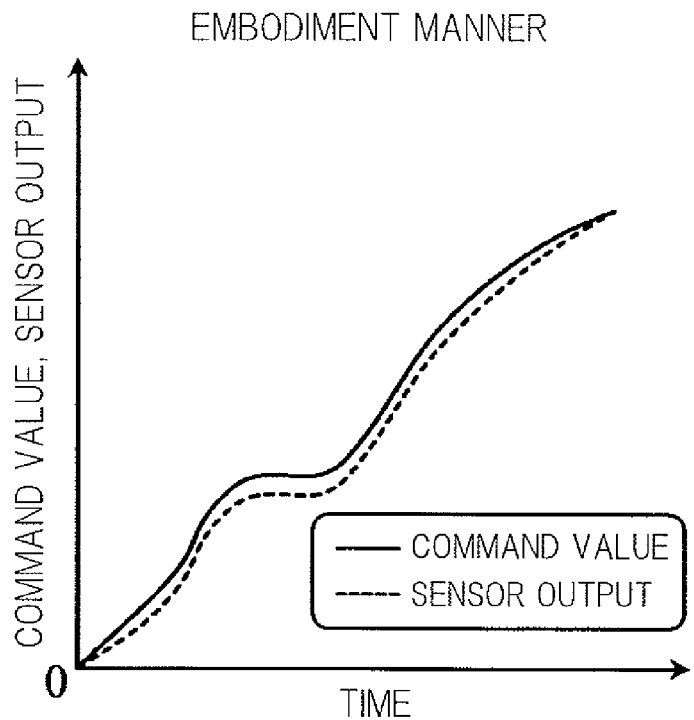
FIG. 11A shows a graph representing a relationship between a sensor output and change of a command value according to a preferred embodiment of the present invention.
Figure 11B:
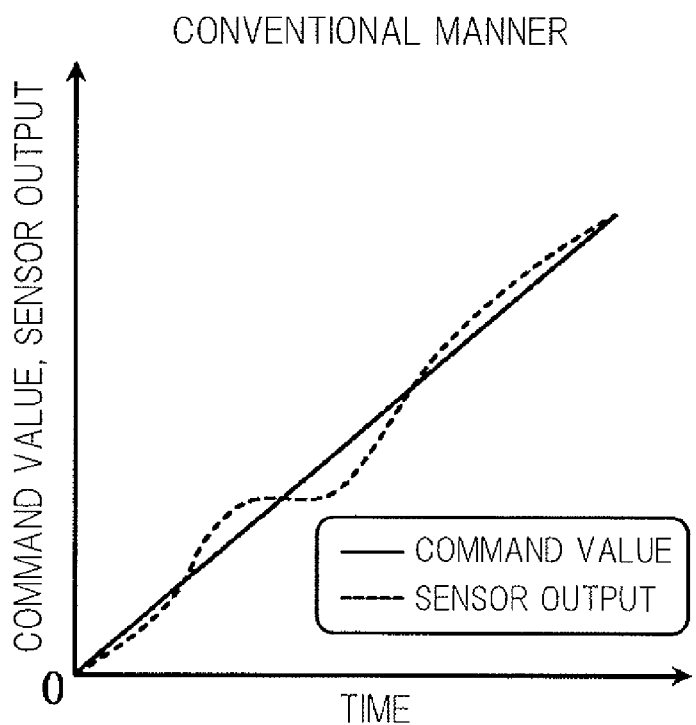
FIG. 11B shows a graph representing a relationship between a sensor output and change of an instruction value in a conventional manner.

The discontinuous linear motor 1 generates a command value by resolving the integrated coordinate into respective command values for each individual motor 3. In a conventional manner, $x_{offset\ i}$ is regarded as a fixed value on the assumption that the sensor feedback exhibits sufficient linearity. Therefore, as shown in FIG. 11B, if the non-linearity of the sensor feedback is significant, rapid increase of deviation is caused, thereby affecting a behavior of the mover 4 due to, for example, vibration. In the technique of the preferred embodiment as shown in FIG. 11A, $x_{offset\ i}$ is preferably measured during operation in consideration of the non-linearity of the sensor feedback, so as to reflect it immediately in the command value. Thus, the multiple unit controller 7 that comprehensively controls the linear motor 1, or the individual motor control unit 6, can be allowed to compensate for the non-linearity of the linear motor 1 with a simplified calculation without previously obtaining information on the non-linearity of the sensor feedback. Therefore, the mover 4 can be smoothly operated.

Figure 10:
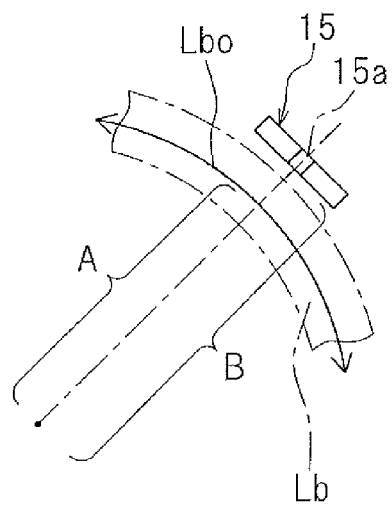
FIG. 10 illustrates a sensor magnification of the sensor according to a preferred embodiment of the present invention.

The magnetic pole pitch $t_p$ represents pitches at which the magnetic pole pairs of the N and S poles are disposed in the mover 4. The correction term c(x), which represents a correction value necessary for the sensor 15 and positioning thereof, may be optionally set, and is determined and defined by preliminary measurement or the like. The correction term c(x) is defined as a function of a position x in the mover moving direction. In other words, the correction term c(x) is a function according to a position of the mover, and may be determined as appropriate. For example, the correction term c(x) takes a value ranging from $0\pi$ to $2\pi$ according to a position (x) in consideration of a skew angle of the individual motor 3. For example, as shown in FIG. 10, the sensor magnification n represents a ratio B/A of a distance B to the sensor from the center O of curvature of a portion of the curved path section Lb, at which the sensor element 15a used for the detection is positioned, relative to a distance A from the center O of curvature to a position on a path center line $Lb_0$. The path center line $Lb_0$ represents a trajectory of the center of the movement of the mover 4. The sensor magnification n is a value that varies according to a sensor setting state, a structure of the rail for the mover 4, and the like, and is set as appropriate in consideration thereof.

According to Equation 3 indicated above, the magnetic pole position $x_{mi}$ can be accurately detected even in the curved path section Lb. When such a magnetic pole position $x_{mi}$ as detected is used for current control, accurate position control and speed control can be performed for the curved path section Lb. In the synchronous type of linear motor, when an inrush of the mover 4 including the permanent magnets into the individual motor 3 occurs, a coil inductance and/or interlinkage magnetic flux vary according to a position. Therefore, current control based on the magnetic pole position $x_{mi}$ is significant for accurate position control and speed control. For the current control based on the magnetic pole position $x_{mi}$, the accurate detection of the magnetic pole position $x_{mi}$ is necessary. However, when the sensor 15 including a linear scale is used, it is difficult to detect the magnetic pole position $x_{mi}$ in the curved path section Lb. This problem can be solved by the technique using Equation 1 indicated above.

The command generator 10 of the multiple unit controller 7 in FIG. 1 preferably includes a motor pitch measurement section 10a and a command generation section 10b. The motor pitch measurement section 10a measures a motor pitch $d_i(x)$ that is a pitch between the neighboring individual motors 3 by using outputs of the sensors 15 to detect a position of the mover 4. The outputs of the sensors 15 are transmitted from individual motor control units 6 to the multiple unit controller 7, and the transmitted values are used to measure the motor pitch. The measurement by the motor pitch measurement section 10a is performed for each movement of the mover 4. The command generation section 10b generates a position command $x_i^*$ to operate each individual motor 3, according to a predetermined equation with the use of the motor pitch di(x) measured by the motor pitch measurement section 10a, with respect to a position command x* inputted from the high-order control unit.

As the predetermined equation, formulas (2) and (3) of Equation 4 indicated below are used.

[Equation 4]

$$\begin{cases} x_i^* = \dot{x} - \sum_{j=1}^{i-1} d_j(x) & (2) \\ d_i(x) = \dfrac{x_{i+1} - x_i}{k} & (3) \end{cases}$$

In Equation 4: $x_i^*$ represents a position command for the i-th individual motor 3, $d_i(x)$ represents a motor pitch, $x_i$ represents a position feedback value transmitted from the individual motor control unit 6 of the i-th individual motor 3, and k represents a conversion coefficient that is optionally defined according to the specifications of the sensor.

Figure 7:
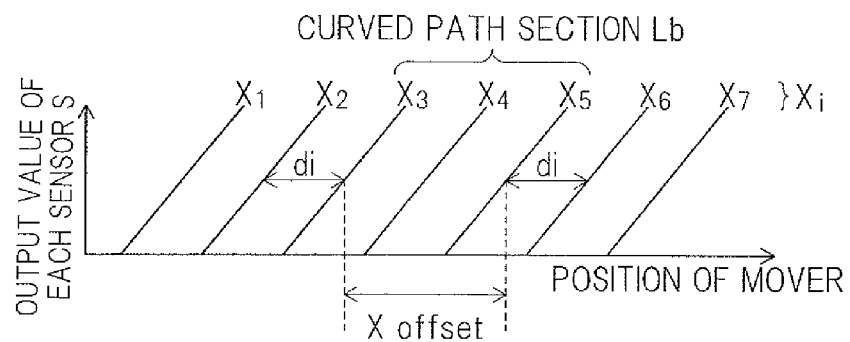
FIG. 7 illustrates outputs from the sensors of each individual motor according to a preferred embodiment of the present invention.
Figure 8A:
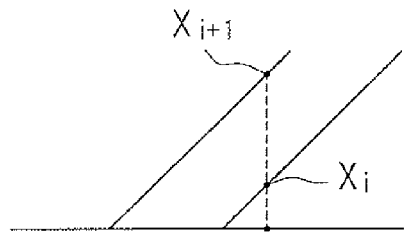
FIGS. 8A and 8B illustrate a relationship between the sensor output and the motor pitch according to a preferred embodiment of the present invention.
Figure 8B:
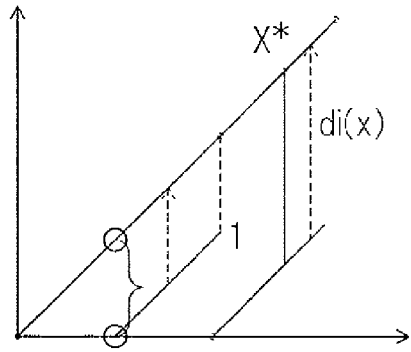

Generation of the position command $x_i^*$ by the command generator 10 of the multiple unit controller 7 will be described with reference to FIGS. 7, and 8A and 8B. By coordinate-conversing the position command x* input from the high-order control unit, the command generator 10 generates the position command x* for each individual motor 3 that includes, as the operational range $M_i$ (FIG. 5), a movement range indicated by the position command x*, and then distributes such a position command x* to the corresponding individual motor 3. Specifically, although a position in the entirety of the linear motor 1 corresponds to an originating position of the individual motor 3 disposed at the end, each individual motor 3 is driven based on a coordinate of an originating position of such individual motor 3. Therefore, a value, obtained by subtracting a value up to the originating position of the individual motor 3 to be operated from a value of the coordinate position in the entirety of the linear motor 1, is set as the position command $x_i^*$ for the individual motor 3 to be operated. Accordingly, the detected values of the sensors 15 of each individual motor 3 are as indicated in FIG. 7. As shown in FIG. 8B, a value, obtained by adding the detected values of each sensor 15 with the exception of the overlapping ranges, indicates a position in the entirety of the linear motor 1.

In order to perform a calculation of subtracting the value up to the originating position of the individual motor 3 to be operated from the value of the coordinate position in the entirety of the linear motor 1, the motor pitch $d_i(x)$ between the neighboring individual motors 3 is necessary. Although the motor pitch $d_i(x)$ in the rectilinear path section La can be defined as a known value, it is difficult to accurately define the motor pitch $d_i(x)$ in the curved path section Lb as a known value. In the preferred embodiment now under discussion, the motor pitch $d_i(x)$ is measured from outputs of the sensors 15 to detect a position of the mover 4, in order to perform the calculations according to formulas (2) and (3) of Equation 4 indicated above.

In Equation 4, "$(x_{i+1}-x_i)/k$" is indicated because, if a detected value $x_i$ of a position of the i-th individual motor 3 is simply subtracted from a detected value $x_{i+1}$ of a position of the (i+1)-th individual motor 3, an error according to the specifications of the sensor may be involved, and therefore an appropriate conversion coefficient k according to the specifications of the sensor is defined, and division by the coefficient is performed in order to cancel the error.

The right-hand side in formula (3) of Equation 4 represents a value obtained by subtracting the motor pitch $d_i(x)$ from the position command x* input by the high-order control unit. In this case, when the movement is started at the starting end of the linear motor 1, the motor pitch $d_i(x)$ to be subtracted represents a value obtained by adding all the motor pitches between the neighboring individual motors 3 with respect to all the individual motors 3 from the individual motor 3 at the starting end to the individual motor 3 at the terminating end in a range in which the movement is to be performed.

Thus, the motor pitch $d_i(x)$ is measured from outputs of the sensors 15 to detect a position of the mover 4, and calculation is performed according to formulas (2) and (3) of Equation 4 indicated above. By doing so, the non-linearity of the sensors 15 can be compensated even in the curved path section Lb, and the position command $x_i$* can be accurately sent to the individual motor control unit 6 of each individual motor 3.

With the discontinuous linear motor system of a preferred embodiment of the present invention having the above structure, since the individual motors 3 acting as armatures on the primary side are discontinuously disposed as a stationary side, coils to be used can be reduced, and a power supply system can be simplified as compared to a case where power is supplied to a movement side. Further, each of the plurality of the individual motors 3 acting as armatures on the primary side, the sensor 15 to perform position detection, and the individual motor control unit 6 that controls the corresponding individual motor 3 are set, and the individual motor 3, the sensor 15, and the individual motor control unit 6 are aligned, so that components can be shared in plural portions of the path, and therefore, cost can be reduced.

Further, the individual motor control unit 6 includes the curved-line correspondence corrector 9 to correct a detection value of each sensor 15 according to a relationship between a curved line of the curved path section and a position of the sensor 15 so as to allow such a detection value as corrected to be used to control the individual motor 3. Therefore, a set of the individual motor 3, the sensor 15, and the individual motor control unit 6 in the rectilinear path section La is preferably used also in the curved path section Lb by simply providing the individual motor control unit 6 with the curved-line correspondence corrector 9 configured by a program and the like, and as a result, position control and speed control can be accurately performed in the curved path section Lb. Specifically, the curved-line correspondence corrector 9 determines the magnetic pole position $x_{mi}$ according to formula (1) of Equation 3 indicated above, and such a magnetic pole position $x_{mi}$ as determined is used for current control through the current control section 13 of the feedback control section 8. Therefore, position control and the speed control in the curved path section Lb can be advantageously performed.

Further, the multiple unit controller 7 preferably includes the command generator 10 including the motor pitch measurement section 10a and the command generation section 10b, as described above, and generates a position command for each individual motor 3, according to formulas (2) and (3) of Equation 4 indicated above, with the use of the magnetic pole position, a positional relationship between the sensor 15 and the path, an offset value for a sensor output, and the like. Therefore, even the discontinuous linear motor 1 can advantageously compensate a non-linearity of outputs from the sensors 15.

Figure 13:
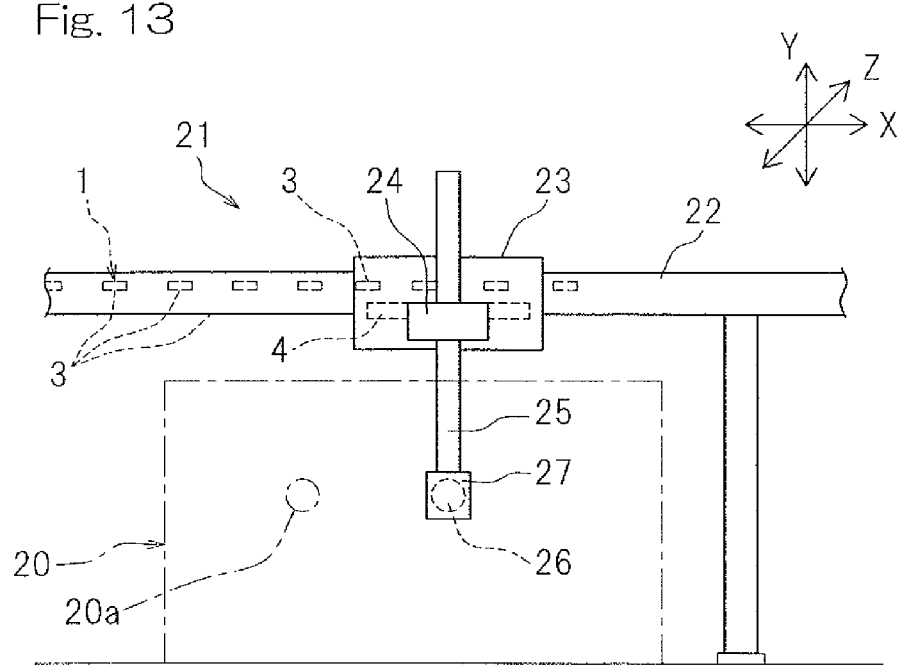
FIG. 13 is a front view of an exemplary transport apparatus to which the discontinuous linear motor system is applied according to a preferred embodiment of the present invention.
Figure 14:
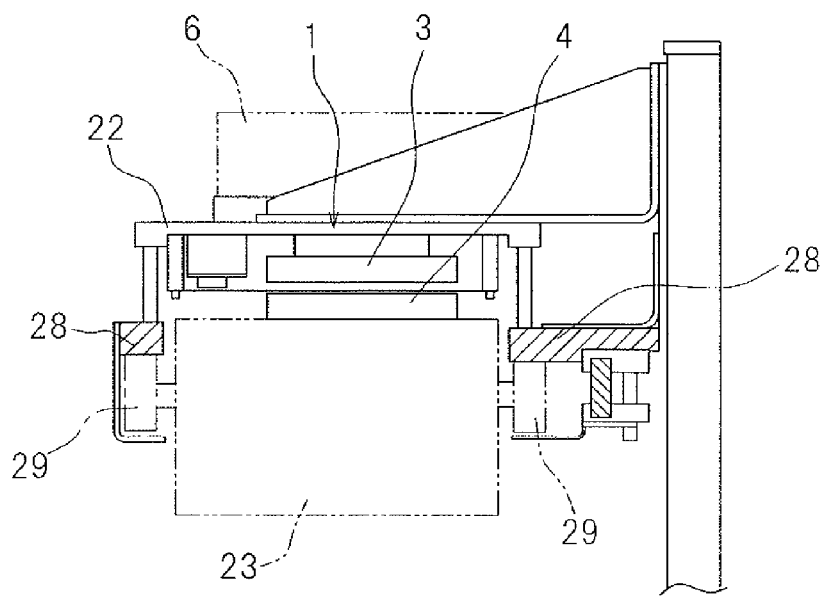
FIG. 14 is a transverse sectional view of the transport apparatus according to a preferred embodiment of the present invention.

FIG. 13 and FIG. 14 show an example of a transport apparatus 21 to which the discontinuous linear motor system is applied. As shown in FIG. 13, the transport apparatus is preferably arranged to act as a gantry loader that transports a workpiece into and from a machine tool 20 such as, for example, a lathe. The transport apparatus 21 preferably includes a traveling member 23, which is movably arranged on a track provided in a horizontal frame 22 along the length direction. The traveling member 23 preferably includes mounted therein an anteroposterior moving carriage 24 that is movable in the forward-backward direction (Z-direction) orthogonal to the traveling direction (X-direction). A rod-shaped lifter 25 is preferably mounted to the anteroposterior moving carriage 24 so as to be movable upward and downward. A loader head 27, preferably including a chuck 26 to hold a workpiece, is provided at the lower end of the lifter 25. The workpiece is preferably delivered and received between the chuck 26 and a spindle 20a of the machine tool 20.

The discontinuous linear motor 1 is provided as a traveling driver of the traveling member 23. The discontinuous linear motor 1 preferably includes the respective individual motors 3 aligned in the frame 22 along the length direction and the mover 4 provided in the traveling member 23. As shown in FIG. 14, the traveling member 23 is preferably arranged so as to travel on a track 28 provided in the frame 22 through wheels 29. In the preferred embodiment now under discussion, the mover 4 is preferably disposed below the individual motor 3 so as to face the individual motor 3. The discontinuous linear motor 1 and the control device 2, according to the preferred embodiment now under discussion, preferably have the same structures as described above with reference to FIG. 1 to FIG. 12 except for the structure specifically described above.

Although the present invention has been described above in connection with the preferred embodiments thereof with reference to the accompanying drawings, numerous additions, changes, or deletions can be devised unless they depart from the gist of the present invention. Accordingly, such additions, changes, or deletions are to be construed as included in the scope of the present invention.

REFERENCE NUMERALS 1 linear motor
2 control device
3 individual motor
3A individual motor group
4 mover
5 frame
6 individual motor control unit
7 multiple unit controller
8 feedback control section
9 curved-line correspondence corrector
10 command generator
10a motor pitch measurement section
10b command generation section
13 current control section
15 sensor
15a sensor element d_i(x) motor pitch
L movement path
La rectilinear path section
Lb curved path section
t_p magnetic pole pitch

| [Reference Numerals] | |
|---|---|
| 1 | linear motor |
| 2 | control device |
| 3 | individual motor |
| 3A | individual motor group |
| 4 | mover |
| 5 | frame |
| 6 | individual motor control unit |
| 7 | multiple unit controller |
| 8 | feedback control section |
| 9 | curved-line correspondence corrector |
| 10 | command generator |
| 10a | motor pitch measurement section |
| 10b | command generation section |
| 13 | current control section |
| 15 | sensor |
| 15a | sensor element |
| $d_i(x)$ | motor pitch |
| L | movement path |
| La | rectilinear path section |
| Lb | curved path section |
| $t_p$ | magnetic pole pitch |

What is claimed is:

1. A linear motor system comprising:
a linear motor; and
a motor control device to control the linear motor; wherein
the linear motor is a discontinuous linear motor including:
a mover including permanent magnets;
a plurality of individual motors spaced from each other along a movement path of the mover, each of the plurality of individual motors defining an armature on a primary side of one independent linear motor and including coils of different phases, respectively, aligned in a straight line direction; and
a sensor to detect a position of the mover, the sensor arranged to act as a linear scale and being disposed, for each individual motor, along the straight-line direction corresponding to a coil-aligned direction;
the motor control device includes:
a plurality of individual motor control units, each disposed relative to a set of the individual motor and the sensor, to control the individual motor in the set; and
a multiple unit controller programmed to send a position command to the plurality of individual motor control units; and
each of the plurality of individual motors is disposed as a stationary side.

2. A discontinuous linear motor system comprising:
a linear motor; and
a motor control device to control the linear motor; wherein
the linear motor is a discontinuous linear motor including:
a mover including permanent magnets;
a plurality of individual motors spaced from each other along a movement path of the mover, each of the plurality of individual motors defining an armature on a primary side of one independent linear motor and including coils of different phases, respectively, aligned in a straight line direction; and
a sensor to detect a position of the mover, the sensor arranged to act as a linear scale and being disposed, for each individual motor, along the straight-line direction corresponding to a coil-aligned direction;
the motor control device includes:
a plurality of individual motor control units, each disposed relative to a set of the individual motor and the sensor, to control the individual motor in the set; and
a multiple unit controller programmed to send a position command to the plurality of individual motor control units;
the movement path of the mover includes a curved path section; and
the individual motor control unit to control the individual motor disposed in the curved path section includes a curved-line correspondence corrector to correct a detection value obtained from the sensor according to a relationship between a curved line of the curved path section and a position of the sensor so as to control the individual motors with the use of the corrected detection value.

3. The discontinuous linear motor system of claim 2, wherein
each individual motor control unit includes a current control section to perform current control according to a magnetic pole position of the mover;
the curved-line correspondence corrector determines the magnetic pole position of the mover from the output of the sensor according to a predetermined equation, and then inputs the determined magnetic pole position to the current control section; and
Equation 1 indicated below is used as the predetermined equation:

$$x_{mi} = \frac{n\pi(s - x_{offset\,i})}{t_p} + c(x), \qquad (1)$$

where $x_{mi}$: a magnetic pole position (rad) for an i-th (i is a natural number) individual motor, s: a sensor output value, $x_{offset\,i}$: a position at which a magnetic pole alignment for the i-th individual motor is performed, $t_p$: a magnetic pole pitch, $c(x)$: a correction term, and n: a sensor magnification (a ratio of a distance to the sensor from a center of curvature of the curved path section, relative to a distance therefrom to a position of a path center line).

4. The discontinuous linear motor system of claim 2, wherein
the multiple unit controller includes a command generator to generate, from an inputted position command, a position command to operate each individual motor,
the command generator includes:
a motor pitch measurement section to measure a motor pitch, that is a pitch between the neighboring individual motors, by using outputs of the sensor; and
a command generation section to generate the position command to operate each individual motor, from the measured motor pitch, according to a predetermined equation; and
as the predetermined equation, formulas (2) and (3) of Equation 2 indicated below are used:

Equation 2

$$\begin{cases} x_i^* = \dot{x} - \sum_{j=1}^{i-1} d_j(x) & (2) \\ d_i(x) = \dfrac{x_{i+1} - x_i}{k} & (3) \end{cases}$$

$x_i^*$: a position command for an individual motor i
$d_i(x)$: the motor pitch
$x_i$: a position feedback from the individual motor control unit i
k: a conversion coefficient (according to specifications of the sensor).

* * * * *